United States Patent [19]
Frigon et al.

[11] Patent Number: 5,427,012
[45] Date of Patent: Jun. 27, 1995

[54] ELECTRONICALLY CONTROLLED FLUID POWERED MOTOR

[75] Inventors: Richard J. Frigon, Michigan City; Allan E. McIntyre, LaPorte; Steven J. Stronczek, Michigan City; Dennis L. Berndt, Gary, all of Ind.

[73] Assignee: Sprague Devices, Inc., Michigan City, Ind.

[21] Appl. No.: 201,788

[22] Filed: Feb. 25, 1994

[51] Int. Cl.6 .................... F15B 13/044; F01B 9/00
[52] U.S. Cl. ........................... 91/459; 91/465; 91/DIG. 1; 92/136
[58] Field of Search ........ 91/459, 1, DIG. 4, DIG. 1, 91/462, 464, 465, 291, 316, 7; 92/136

[56] References Cited

U.S. PATENT DOCUMENTS

| | | | |
|---|---|---|---|
| 4,538,644 | 9/1985 | Knutson et al. | 91/459 X |
| 4,574,686 | 3/1986 | Budzich | 91/459 X |
| 4,632,013 | 12/1986 | Frigon | 91/7 |
| 4,651,627 | 3/1987 | Stewart | 92/136 X |
| 4,753,071 | 6/1988 | Sugden | 92/136 X |
| 4,754,693 | 7/1988 | Teltscher | 91/459 X |
| 5,018,431 | 5/1991 | Gray et al. | 91/459 X |
| 5,148,735 | 9/1992 | Veletovac | 91/459 |

Primary Examiner—Edward K. Look
Assistant Examiner—Hoang Nguyen
Attorney, Agent, or Firm—Baker & Daniels

[57] ABSTRACT

A reciprocating piston fluid powered motor which has a fluid inlet and a fluid outlet. Reciprocation of the piston is controlled by a reciprocable valve spool which communicates with the fluid inlet and fluid outlet. The valve spool cooperates with a valve slide which is shiftable on said valve spool to control spool reciprocation. Fluid flow through the fluid inlet and outlet is controlled by electrically actuated solenoid valves connected in flow communication to the fluid inlet and a park port. An electric pulse width modulating switch is connected to each solenoid valve and has a plurality of positions to enable the piston to reciprocate at continuous low and high speed as well as in an intermittent mode. The switch may also be connected to an air powered washer fluid pump to deliver cleaning fluid on command.

8 Claims, 7 Drawing Sheets

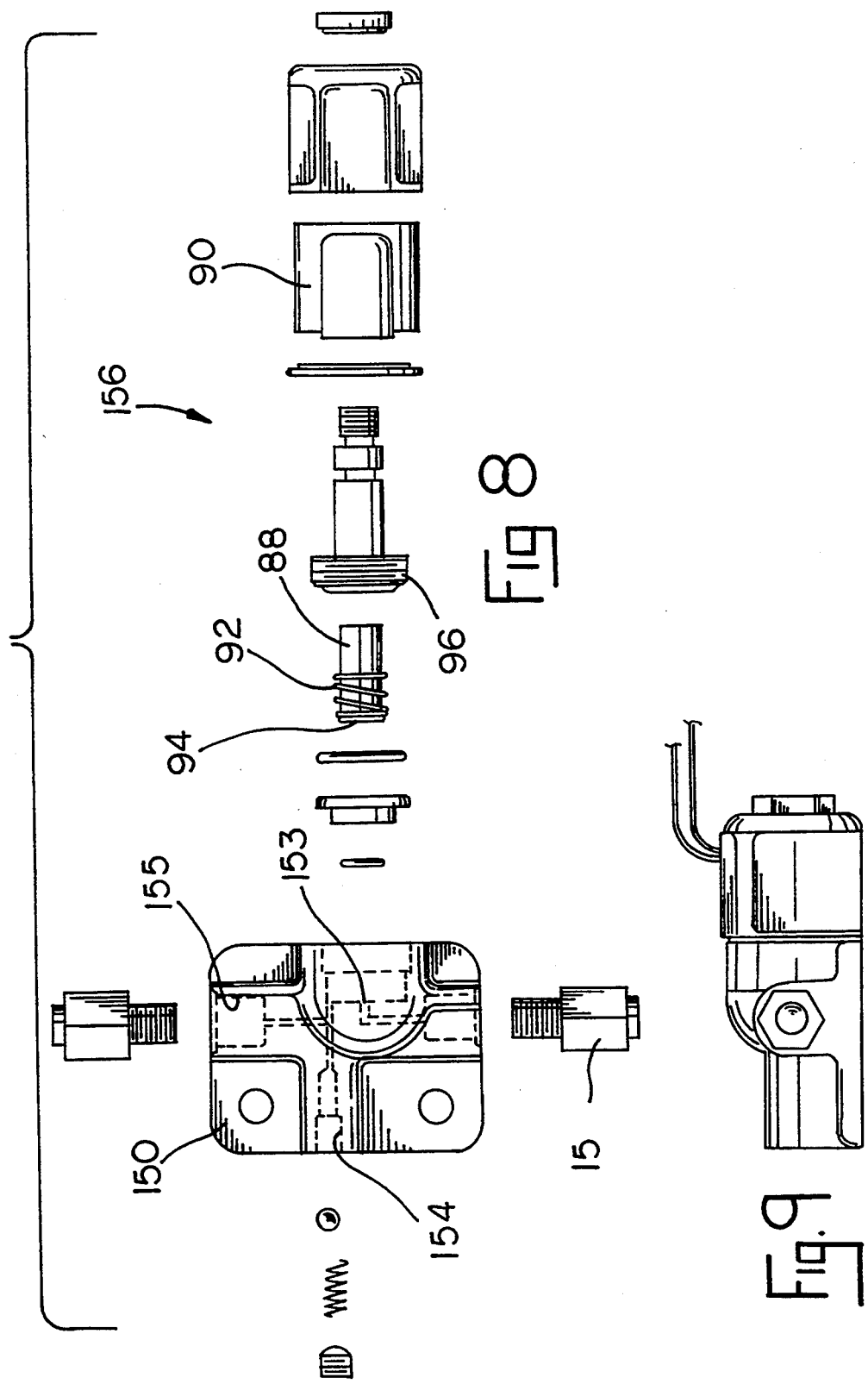

ELECTRONICALLY CONTROLLED FLUID POWERED MOTOR

FIELD OF THE INVENTION

This invention relates to fluid powered motors, and will have application to an electronically controlled reciprocating piston fluid powered motor.

BACKGROUND OF THE INVENTION

Fluid powered reciprocating piston motors have long been in use, particularly in heavy truck and bus windshield wiper drivers. Previously, fluid powered motors have had the fluid flow controlled by a simple gate valve which was operably connected to a mechanical switch. When the gate valve is switched to an on position, fluid flow to the park port of the motor is cut off. This causes a shiftable spool valve to shift into a run position which aligns the various fluid ports of the motor. Fluid flow through the manifold and motor ports causes the reciprocating movement of the piston which is typically connected to a wiper armby rack and pinion gears.

A typical fluid powered motor as described above is shown and described in U.S. Pat. No. 4,632,013, which is also owned by the assignee of this invention, and is incorporated herein by reference. Typically, the motor is powered by pressurized air, but any compressible fluid can be adapted to power the motor. Motors constructed according to the teachings of the '013 patent are highly dependable performers with regard to both accuracy and durability.

Such fluid-powered motors have several shortcomings however. Because of the simple nature of the control valve, these motors are generally operated at only low and high duty cycle speeds, or in a continuous intermittent mode. Because the control valve is normally shifted only between full open and full closed positions, the reciprocating piston and connected wiper arm are normally either stationary or operating at constant speed.

A second drawback is the requirement of two separate fluid lines and control valves to operate the motor in low and high speeds. Automatic intermittent duty cycles are not passable in a mechanically controlled fluid powered motor.

A third drawback is the problem of whipstroke, which occurs during the first duty cycle of a typical motor. Whipstroke results from the lack of a fluid cushion in the cylinder chamber opposite the chamber which receives the first delivery of pressurized fluid after the motor is switched on.

SUMMARY OF THE INVENTION

The fluid powered reciprocating piston motor of this invention includes an electric switch which controls electronically operated fluid input valves at the park and run ports of the motor. The valves are preferably electronically controlled solenoid valves and the switch is preferably a pulse width modulated (PWM) switch which is capable of delivering one of a number of timed signals to the solenoid valves.

Due to the versatility of the PWM switch and solenoid valves, the motor can be operated in slow, fast and various intermittent modes accurately and dependably. Further, the switch is also connected to a washer pump which delivers cleaning fluid to the windshield in response to a signal from the switch.

Use of the PWM switch and solenoid valves also allows the motor to be operated by a single source of pressurized fluid. Also, the motor may be operated by a single source of pressurized fluid. Also, the motor may be pressurized when switched on to eliminate the whipstroke effect commonly encountered in prior art fluid powered motors.

Accordingly, it is an object of this invention to provide for an electronically controlled fluid powered motor.

Another object is to provide for a fluid powered motor which can be operated at varying constant and intermittent speeds.

Another object is to provide a novel electronic control system for a fluid powered motor.

Another object is to provide for a fluid powered motor which is dependable, economical, and which eliminates whipstroke.

Other objects will become readily apparent upon a reading of the following description.

BRIEF DESCRIPTION OF THE DRAWINGS

A preferred embodiment of the invention has been depicted for illustrative purposes only wherein:

FIG. 8 is an exploded view of the washer module.

FIG. 9 is an elevation view of the washer module.

DESCRIPTION OF THE PREFERRED EMBODIMENT

Figure 1:
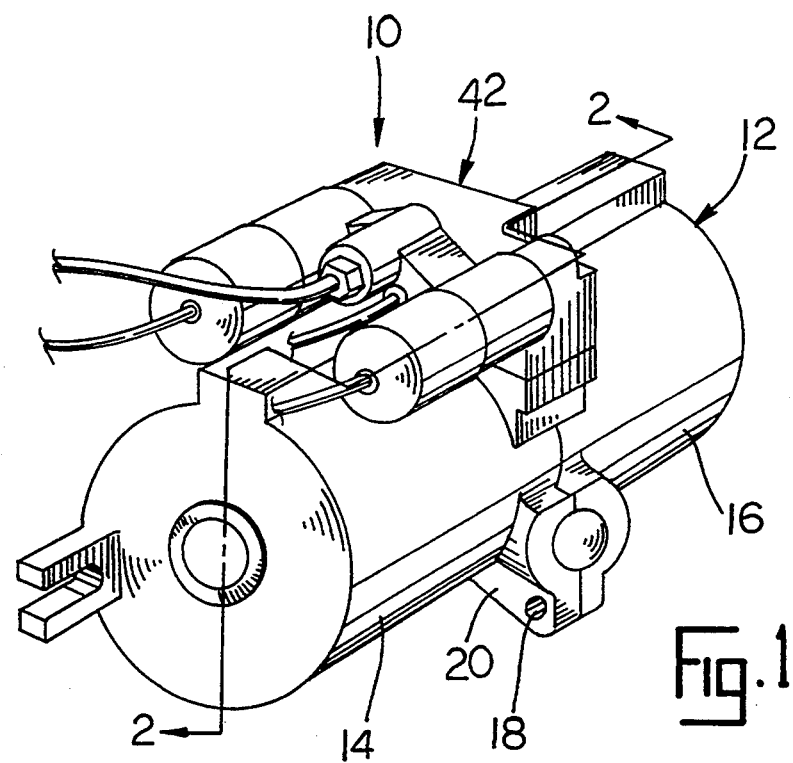
FIG. 1 is a perspective view of the motor of this invention.

The preferred embodiment herein described is not intended to be exhaustive or to limit the invention to the precise form disclosed. It is chosen and described to explain the principles of the invention and its application and practical use to enable others skilled in the art to utilize the invention.

Referring first to FIGS. 1–5, reference numeral 10 generally designates the fluid powered motor of this invention. Motor 10 includes a motor housing 12 which has two complementary cup-shaped housing parts 14 and 16 secured together as by screws 18 extending through projecting end flanges 20. Motor housing 12 defines an internal piston bore 22.

Reciprocating piston 24 is slidably housed in piston bore 22. Seals 26 prevent fluid transfer from inner chamber 28 to inner chamber 30 to ensure smooth and efficient reciprocation of piston 24. Piston 24 includes a rack 32 which is mechanically connected to pinion gear 34 of shaft 36. This connection allows translation of the linear movement of piston 24 into rotational movement of shaft 36.

Motor housing 12 also includes internal passages 38 and 40 which communicate respectively with chambers 28 and 30. A manifold 42 is mounted to motor housing 12 as by fasteners (not shown) and defines inlet port 44, run port 45, park port 46 and exhaust port 48. Spool valve 50 is slidably fitted on the center wall 25 of housing 12. Housing 42 defines fluid passages 51, 52, 53, 54 and manifold 42 defines park passage 56. Spool valve 50 defines recess 58 which selectively allows fluid to pass through one or more selected passages 51-54 depending upon the position of the spool valve. Exhaust port 48 houses an exhaust valve (not shown) of common construction to regulate fluid flow out of the manifold 42.

The construction and operation of the motor 10 with the exception of manifold 42 is the same as the motor described and claimed in U.S. Pat. No. 4,632,013, which is incorporated herein by reference. Further details of construction and operation of motor 10 have been omitted from this disclosure in the interests of clarity.

Figure 5:
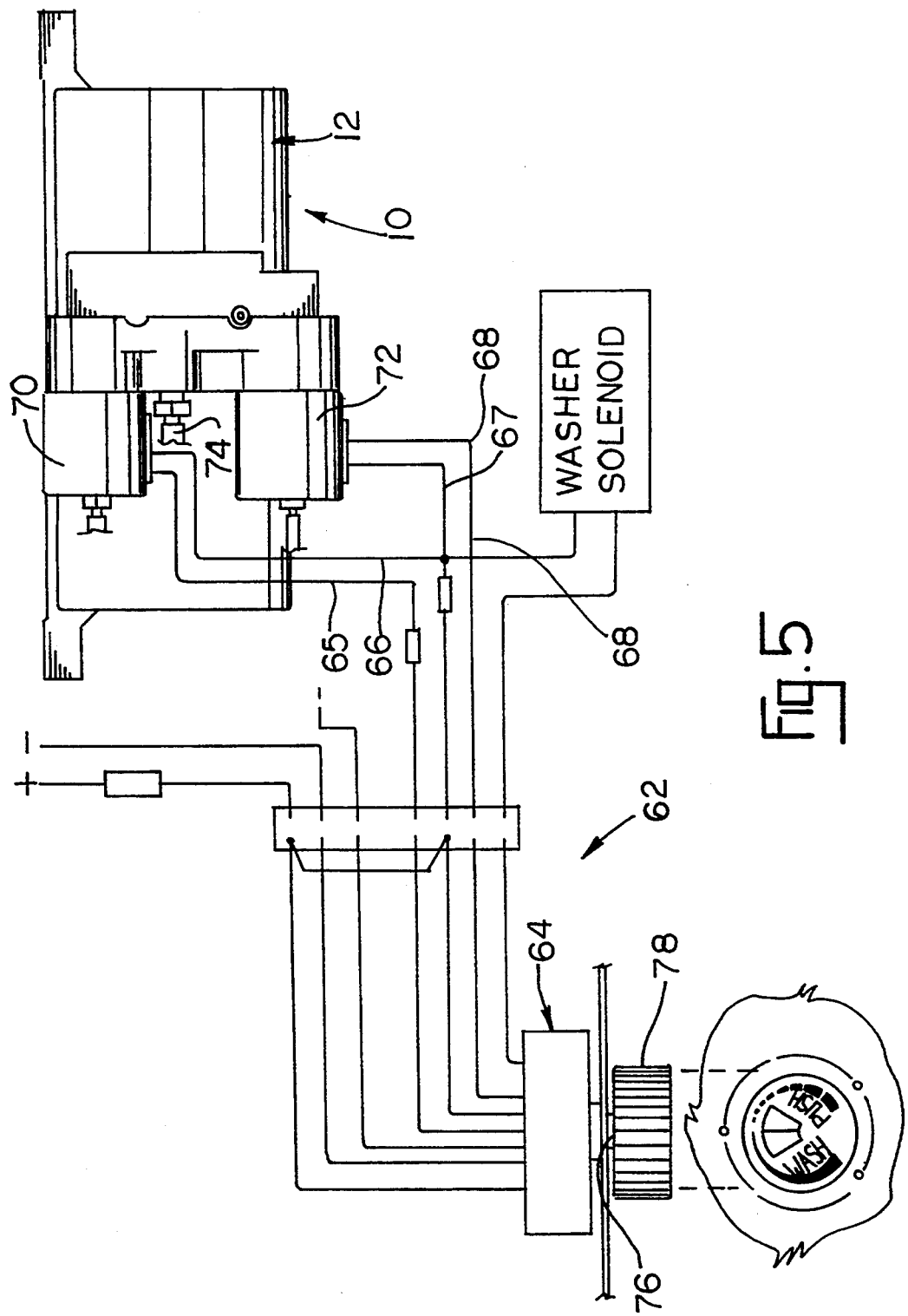
FIG. 5 is a top plan view of the motor in use with a wiper control circuit.
Figure 6A:
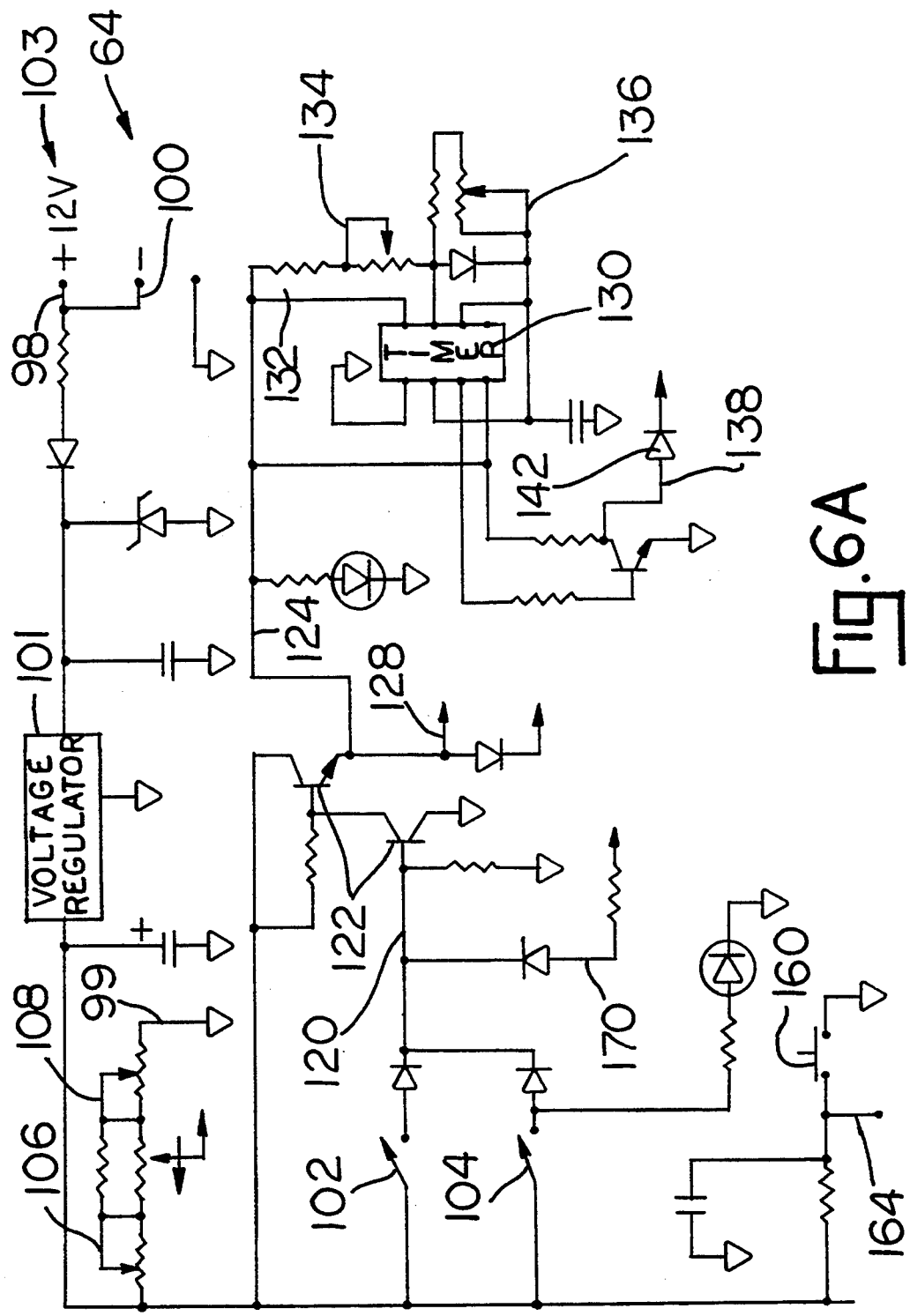
FIG. 6A and 6B are circuit diagrams depicting the electric circuit for the motor.
Figure 6B:
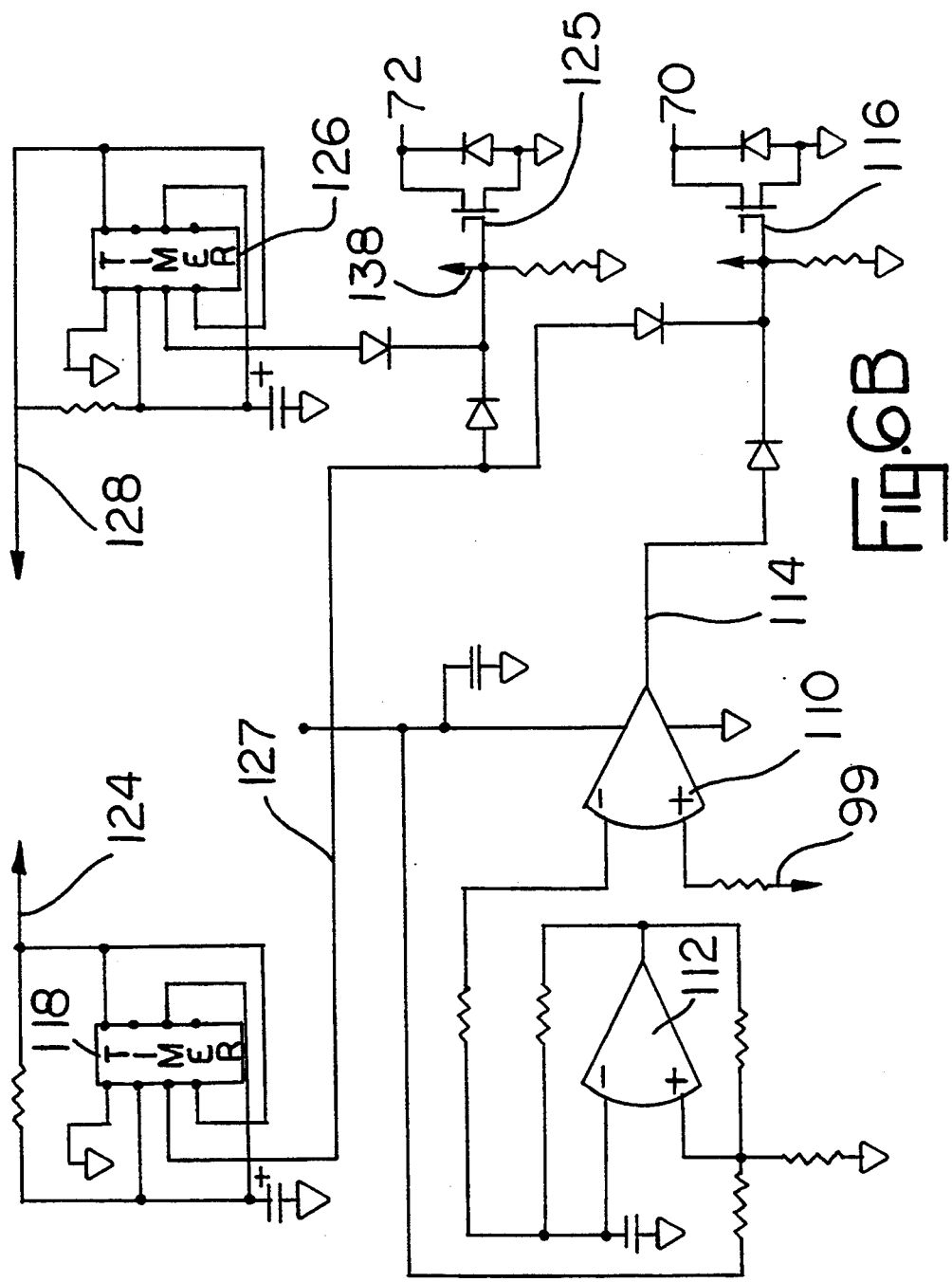

FIGS. 5, 6A, and 6B depict the electronic control mechanism 62 which controls the fluid flow into motor 10 and thus controls its operational characteristics. For purposes of illustration and description only, motor 10 has been depicted as a pneumatic powered motor, which is commonly used to drive the windshield wipers/washer of heavy vehicles, such as trucks and buses. For purposes of the claimed invention, motor 10 will doubtless find many other uses in driving oscillating, reciprocating members.

Control mechanism 62 includes a switchable electronic controller 64 which is connected as by leads 65, 66, 67, 68 to solenoid valves 70 and 72. Solenoid valve 70 is connected in flow communication with run port 45 and solenoid valve 72 is connected in flow communication with park port 46. A fluid supply line 74 connects a supply of pressurized fluid (not shown) with inlet port 44. Solenoid valves 70, 72 are commercially available items which include the usual solenoid components as described below. Switchable controller 64 is electrically coupled by control shaft 76 to a rotatable knob 78 located in the vehicle interior for easy access by the driver. Knob 78 may be substituted by a slide control or other acceptable device.

Control mechanism 62 enables the motor 10 to operate at variable speeds from off to full on with a full range of intermittent and continuous operational cycles in between. Circuitry for the controller 64 is depicted in FIGS. 6A and 6B and will be described in detail below.

Figure 2:
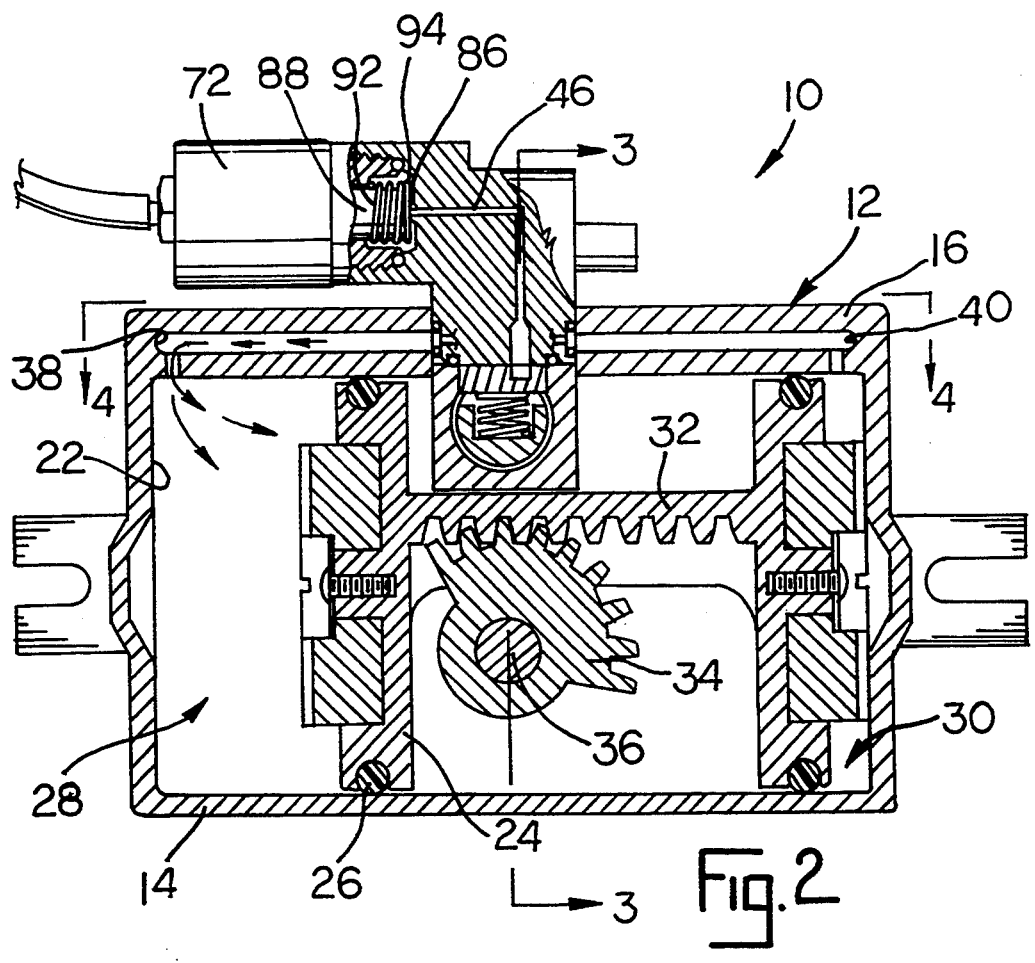
FIG. 2 is a sectional view of the motor taken along line 2—2 of FIG. 1 with the motor shown in a run mode.
Figure 4:
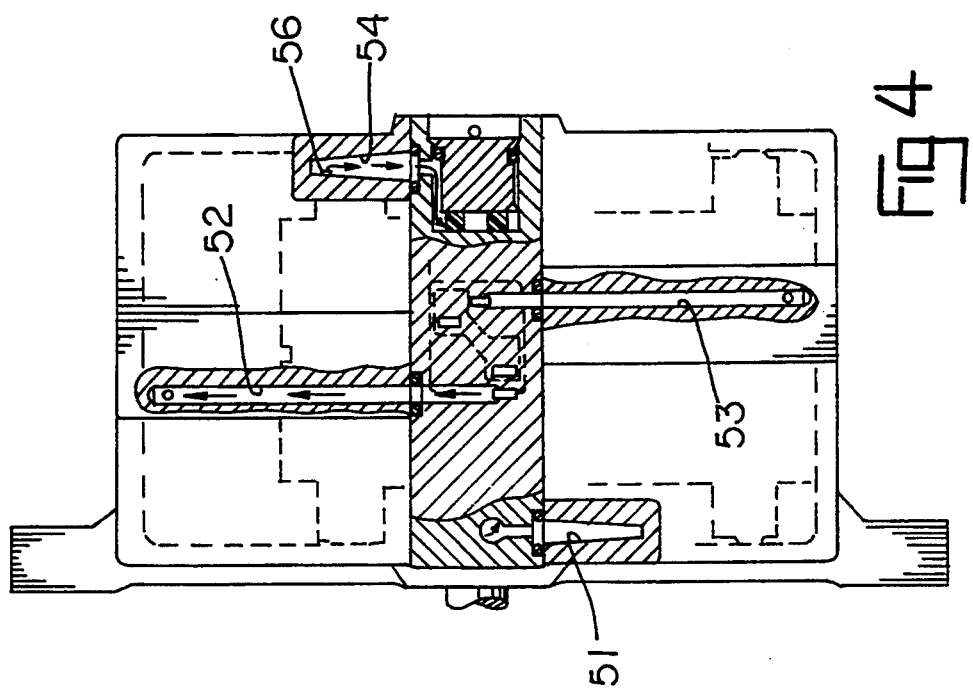
FIG. 4 is a cross-sectional view taken along line 4—4 of FIG. 2.
Figure 3:
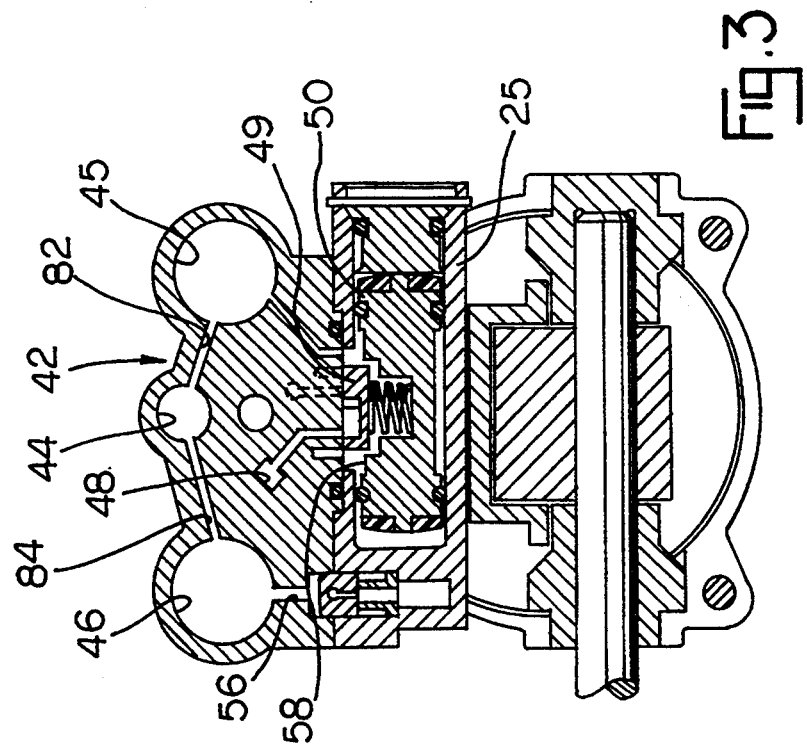
FIG. 3 is a cross-sectional view taken along line 3—3 of FIG. 2 but showing the motor in a parked mode.

In operation, a supply of pressurized fluid (such as air) is continuously introduced into inlet port 44 through fluid supply line 74. Channels 82, 84 in manifold 42 connect inlet port 44 in flow communication with run port 45 and park port 46 as shown in FIGS. 2-4. Run port 45 communicates with selected passages 5154 depending upon the position of spool valve 50 and slide 49. Park port 46 communicates with spool valve 50 as shown and described in U.S. Pat. No. 4,632,013.

A valve seat 86 is located adjacent run port 45. Solenoid valve 70 has its component parts shown in FIG. 11 and includes movable armature 88 which is shiftably positioned in electromagnetic coil 90 and surrounded thereby. A biasing member, shown as spring 92 urges armature 88 towards the closed position with poppet 94 in sealing contact against valve seat 86. In the closed position, no air flows through run port 45 and piston 24 is stationary.

Solenoid valve 72 is identical in construction to solenoid valve 70 and the same reference characters will be used in depicting its component ports. Solenoid valve 72 is connected to park port 46 and in its closed position blocks air from reaching the park port. Solenoid valves 70, 72 are connected to the manifold 42 as by mating threads 96, and will be henceforth referred to as the run solenoid and park solenoid, respectively.

Switchable controller 64 is shown in schematic form in FIGS. 6A and 6B. Controller 64 is connected via leads 98, 100 and voltage regulator 101 to a power source 103, typically a vehicle battery. Controller 64 includes switches 102, 104 which communicate electrically with control shaft 76. Potentiometers 106, 108 (FIG. 6A) are connected via lead 99 to the positive input of oscillator 110 (FIG. 6B). Sawtooth oscillator 112 is connected to the negative input of oscillator 110. The output of oscillator 110 is connected via lead 114 and FET transistor 116 to the run solenoid valve 70.

Switchable controller 64 also includes timer 118 connected in series to switches 102, 104 via lead 120, transistors 122 and lead 124. The output of timer 118 is connected to park valve 72 through lead 127 and FET transistor 125. Timer 126 is connected to switches 102, 104 via lead 128 and has its output connected to park valve 72 and to run valve 70 as shown.

Controller 64 further includes intermittent function timer 130 which is connected to the output of transistor 122 by lead 132 and potentiometer 134. Potentiometer 136 is connected in a loop between timer 130 and ground. The output of timer 130 is connected via lead 138 and diode 142 to park solenoid valve 72.

Switchable controller 64 operates to send electrical signals to solenoids 70, 72 and to operate motor 10 as follows. With the switch knob 78 in the "off" position, controller 64 takes the orientation shown in FIG. 6A. In this position (with switches 102, 104 open) no signals are sent to solenoids 70, 72 and springs 92 urge the respective armatures 88 and poppets 94 against valve seats 86. No air flows through motor 10 and no movement of piston 24 or shaft 36 takes place.

When a user turns knob 78 (and shaft 76), switches 102, 104 close. An electric signal is sentralong lead 120, transistor 122 and lead 124 to timer 126 which sends the signal to park valve 72 for a predetermined time, usually just less than i second. Park valve 72 energizes to remove poppet 94 from valve seat 86. This momentarily opens park port 46 to allow air to be delivered into chamber 28 and prepressurize that chamber. This prepressurization of chamber 28 ensures that the first stroke of piston 24 is cushioned by air and eliminates the "whipstroke" effect of the piston which would occur if the chamber had not been pressurized. After the initial pressurization, the output of timer 126 is diverted to ground.

The duty cycle of motor 10 depends on the position of control shaft 76 as selected by the user's positioning of knob 78. With the shaft 76 and knob 78 set for intermittent motor operation between the "off" and "low" positions, the run switch 102 and park switch 104 are closed and both solenoids 70, 72 are energized. Since this position of switches 102, 104 would cause motor 10 to be continuously parked, timer 130 serves to relay the electric signal to park valve 72 at the selected interval time, dependent upon the position of knob 78 and control shaft 76 as read by potentiometer 136. With the park valve 72 closed, motor 10 operates as described above and in U.S. Pat. No. 4,632,013 to deliver a single full stroke of piston 24 as timed by potentiometer 134. The time the park valve 72 is open to "park" the motor and prevent further strokes is determined by potentiometer 136 and the piston of knob 78. The further knob is turned towards the "low" position, the shorter will be the interval between energization of park valve 72 and the strokes of piston 24.

When knob 78 is turned to the "low" speed position, park switch 104 is opened and run switch 102 remains closed. Sawtooth oscillator 112 send signals to the negative input of oscillator 110 and potentiometers 106, 108 send pulsed signals to the positive input of oscillator 110. The output of oscillator 110 is a corresponding pulsed signal to run valve 70 through FET transistor 116. The pulsed signal energizes and deenergizes run valve 70 (the park valve 72 is closed during "low" and "high" speed operations) at regular intervals to allow air flow into the motor at a constant volume and produce continuous fluid motion of piston 24 and shaft 36.

As the knob 78 is advanced towards the "high" speed position the signals sent through potentiometers 106, 108 and oscillator 110 decrease the interval between pulses sent to the run valve 70 and increase the volume of air delivered to chambers 28, 30. This increase the speed of reciprocation of piston 24 and correspondingly, the speed of oscillation of shaft 36. Finally, when the knob 78 is advanced to the "high" speed position the signals sent to run valve 70 are constant and the run valve is always open. Fluid pressure through line 74 determines the top speed of reciprocation of piston 24 and shaft 36.

When controller 64 is switched to "off" from any of the active duty cycles described above, an electric signal is delivered to park valve 72 to "park" the motor prior to the opening of switches 102, 104. In the case of motor 10 being used to drive vehicle windshield wipers, this function allows the piston 24 and shaft 36 to complete the stroke and return the wipers (not shown) to their customary out-of-sight (parked) position.

When motor 10 is used to drive vehicle windshield wipers, a washer control 146 and washer pump not shown may be incorporated into controller 64 with motor 10. As shown in FIGS. 8-9, washer control 146 includes housing 150 which is connected to pressurized air supply line 152 and fluid inlet line 154 which holds the wash fluid. Solenoid valve 156 which is of similar construction to valves 70, 72 is connected to housing 150 with its poppet 94 normally blocking air inlet 153. When solenoid valve 156 is energized, poppet 94 retracts into coil 90 to permit pressurized air to flow into inlet 153 and urge wash fluid through outlet 155 to the vehicle windshield (not shown).

Figure 7:
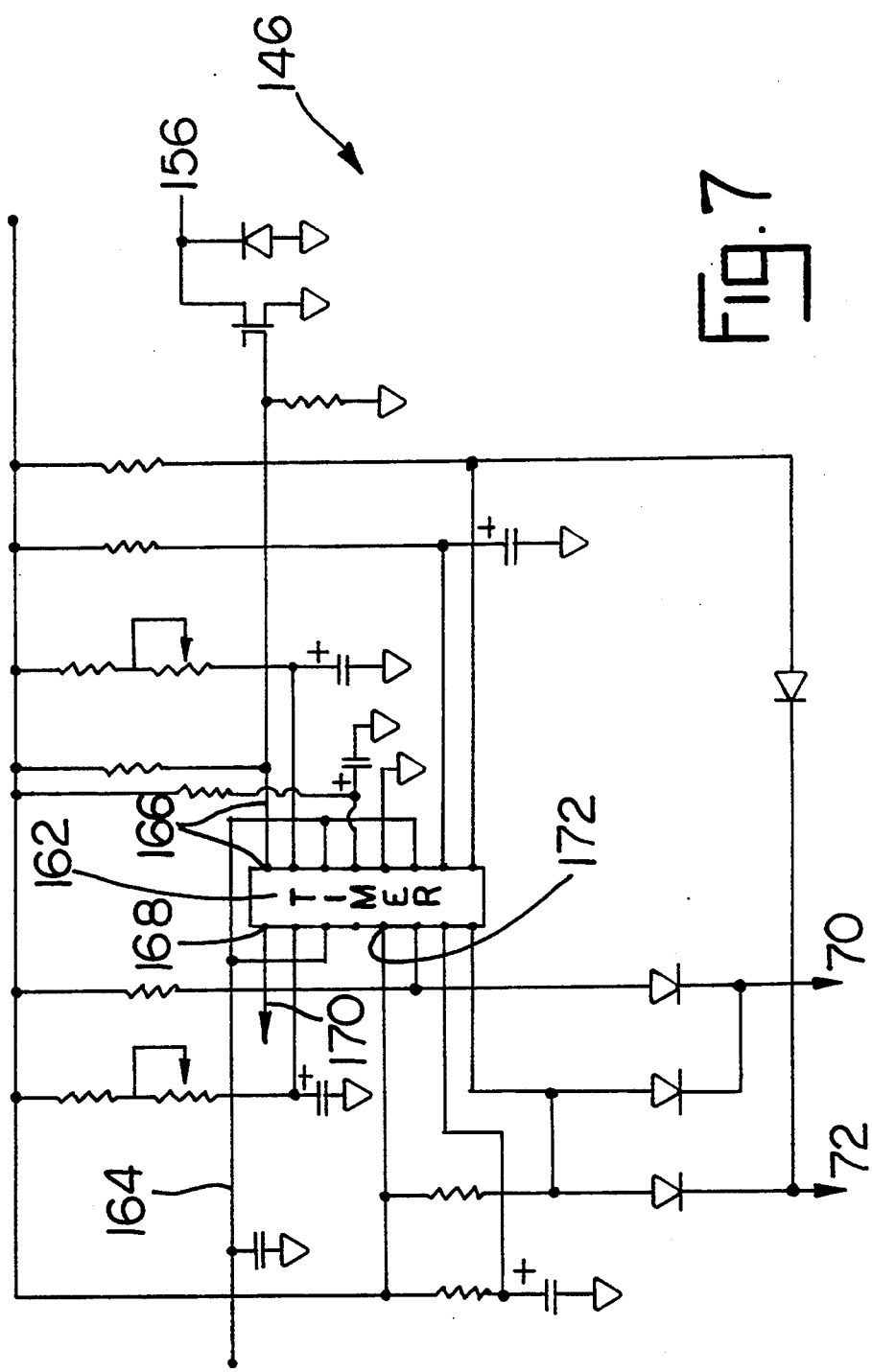
FIG. 7 is a circuit diagram for the washer station.

FIG. 7 schematically depicts the electric washer control circuit 146 associated with controller 64. When used with knob 78 and shaft 76, washer control circuit 146 incorporates push button switch 160 (FIG. 6A) to actuate the control circuit 146. A wash timer 162 is connected via lead 164 to switch 160. Timer 162 shown performs three functions. First, timer 162 has an output 166 connected to solenoid 156 to control the length of time the wash solenoid is open to dispense wash fluid. Second, timer 162 has an output 168 connected via lead 170 to anti-whipstroke timer 126. The third timer output 172 is connected to park valve 72 to repark the system when the wash cycle is completed.

Activating the wash cycle by depressing switch 160 also closes the park valve 72 and activates oscillators 110, 112 to place the run valve 70 in a continuous speed mode, as described above, for the duration of the wash cycle. When the wash cycle is finished (as determined by timer 162), output 172 signals motor 10 (valve 72) to "park" and the function of motor 10 is again controlled dependent upon the position of knob 78 and control shaft 76.

The unnumbered parts of the motor 10 and control circuits 64 and 146 are well within the purview of those skilled in this art and will not be defined as to structure or function in the interests of clarity. The above description illustrates the mechanical and electrical electronic principles behind the multivariate duty cycles of motor 10 from "off" to "high" with the various "intermittent" and continuous "low" speeds available, as well as the wash cycle.

Those descriptions, while tailored to the adoption of motor 10 into a vehicular windshield wiper/washer system, are in no way limitative of the functions or elements of the motor. The scope of this invention is thus not confined to the above-given details, but may be modified within the bounds of the following claims.

What is claimed is:

1. An oscillating fluid powered motor system including a housing defining an inner chamber, said housing having an inlet port communicated to a fluid pressure source and an exhaust port, a piston reciprocally housed in said inner chamber, a motor shaft journaled in said housing, drive transmission means connecting said piston and said shaft, said housing having an inlet passage communicating said inlet port with a shiftable valve means for controlling communication between said inlet passage and each of a pair of control passages communicating said shiftable valve means with said inner chamber on opposite sides of the piston, said shiftable valve means being slidably mounted in said housing and shiftable in response to movement of said piston from a position communicating one of said control passages to the inlet passage and the other control passage to the exhaust port to a position communicating the other control passage to the inlet passage and the one control passage to the exhaust port, control electrically actuated valve means for controlling communication through said inlet passage from said inlet to said shiftable valve means, and control means for controlling said control electrically actuated valve means, said housing including a park passage communicating said inlet port with said shiftable valve means, and a park electrically actuated valve means controlling communication through said park passage to drive the shiftable valve means to a predetermined position to establish communication between said inlet passage, said control passages, and said exhaust port to drive said piston to a predetermined park position within said chamber.

2. Fluid powered motor system as claimed in claim 1, wherein said control means includes a manually controlled switch and an electronic controller responsive to said switch for controlling said electrically actuated valve means.

3. Fluid powered motor system as claimed in claim in claim 2, wherein said electronic controller includes means responsive to said switch for generating pulsed electrical signals and for transmitting said pulsed electrical signals to said control electrically actuated valve means, said control electrically actuated valve means responding to said pulsed electrical signals to open and close communication in said inlet passage at a rate established by said pulses.

4. Fluid powered motor system as claimed in claim 2, wherein said switch means is movable from an "off" position to at least one position in which said motor is operated, said controller including timer means responsive to movement of said switch from said "off" position to actuate said park electrically actuated valve means for a predetermined time period.

5. Fluid powered motor system as claimed in claim 2, wherein said switch means is movable from an "off" position to a first range of positions in which said piston is operated intermittently with a variable intervening time period, said controller including first pulse generating means for actuating the control electrically actuated valve means and second pulse generating means for actuating the park electrically actuated valve means.

6. Fluid powered motor system as claimed in claim 2, wherein said switch means is movable from an "off" position to a range of positions in which said piston is reciprocated at varying speeds which vary as a function of the position of the switch within said range, said controller including pulse generating means for actuating said control electrically actuated valve means at a pulse rate that varies as a function of the position of the switch within said range, said control electrically actuated valve means being responsive to said pulses to open and close at a frequency that is a function of said pulse rate.

7. Fluid powered motor system as claimed in claim 2, wherein a washer control electrically actuated valve means is responsive to said switch for operating a windshield washer device.

8. Fluid powered motor system as claimed in claim 1, wherein said controller includes pulse generating means for actuating said control electrically actuated valve means, said control electrically actuated valve means being responsive to said pulses to open and closes at a frequency that is a function of said pulse rate.

* * * * *